United States Patent
DeFreitas

[19]
[11] Patent Number: 5,939,675
[45] Date of Patent: Aug. 17, 1999

[54] JUNCTION BOX AND LID FOR ELECTRICAL CONDUITS

[76] Inventor: Glennon L. DeFreitas, 2542 Edgar Crescent, Vancouver, British Columbia, Canada, V6L 2G4

[21] Appl. No.: 08/912,356

[22] Filed: Aug. 18, 1997

[51] Int. Cl.[6] ...................................................... H02G 3/18
[52] U.S. Cl. ............................................. 174/65 R; 285/4
[58] Field of Search .................................... 174/65 R, 66, 174/50; 285/3, 4; 220/3.8, 241

[56] References Cited

U.S. PATENT DOCUMENTS

| | | | |
|---|---|---|---|
| 609,356 | 8/1898 | Krantz | 220/3.8 |
| 642,521 | 1/1900 | Greenfield | 220/3.8 |
| 2,085,394 | 6/1937 | Sargent | 164/292 X |
| 2,148,872 | 2/1939 | Nicholas | 174/50 X |
| 3,139,480 | 6/1964 | Desloge | 174/65 R X |
| 3,902,002 | 8/1975 | Smith | 174/65 R X |
| 4,750,411 | 6/1988 | Eversole | 285/4 X |
| 4,836,580 | 6/1989 | Farrell | 285/24 |
| 4,845,312 | 7/1989 | Lee | 174/65 R |
| 4,880,387 | 11/1989 | Stikeleather et al. | 174/65 R X |
| 4,896,784 | 1/1990 | Heath | 174/65 R X |
| 5,051,541 | 9/1991 | Bawa et al. | 174/65 SS |
| 5,125,527 | 6/1992 | Parlatore et al. | 174/65 R X |
| 5,726,384 | 3/1998 | Veermeer | 174/50 X |

FOREIGN PATENT DOCUMENTS

| | | | |
|---|---|---|---|
| 6615374 | 5/1968 | Netherlands | 174/65 R X |
| 654958 A5 | 3/1986 | Switzerland | 174/65 R X |

*Primary Examiner*—Dean A. Reichard
*Attorney, Agent, or Firm*—Hall, Priddy & Myers

[57] ABSTRACT

A prefabricated junction box and lid for use in the floors, walls and ceilings of a building. The junction box has tubular projections extending from an exterior sidewall and sealed by removable knockouts. When a knockout is removed, an annular ring extends into an interior of the tubular projection so as to retain corrugated electrical conduit inserted therethrough. The junction box lid includes locking tabs aligned with each tubular projection which substantially improve the capacity of the box to retain electrical conduit. The annular ring and corresponding locking tab, in combination, are operative to engage against an outer surface of the corrugated electrical conduit so as to lock the conduit.

15 Claims, 10 Drawing Sheets

JUNCTION BOX AND LID FOR ELECTRICAL CONDUITS

FIELD

The present invention relates to a prefabricated junction box and lid for interconnecting electrical conduit which can be used in the floors, ceilings and walls of residential, commercial and other buildings.

BACKGROUND

Conventional electrical systems within residential and commercial buildings have a plurality of interconnecting electrical conduits joined to each other and to junction boxes with adapters. Although a number of metallic junction boxes exist on the market, the preferred approach is to use polyvinyl chloride (PVC) electrical conduit and junction boxes which are less costly and easier to install.

One type of junction box in use includes a plurality of open ports into which electrical conduit must be placed to seal the box. The open ports which are not in use must be independently sealed when not in use to prevent concrete and other material from entering the junction box. This has proven disadvantageous, since sealing open ports requires separate components, additional time and additional expense. There also exists the risk that some of the open ports which require sealing will be missed during installation, exposing electrical wiring to contamination. This is a particular problem where the space surrounding the junction box is filled with concrete.

Another conventional junction box includes a number of knockout regions which may be opened to allow for access into the box. This junction box requires separate adapters which must be fitted into the knockout region in order to connect the electrical conduit to the box and results in additional assembly time and expense.

Examples of the above junction boxes and other related boxes can be found in U.S. Pat. Nos. 3,139,480, 4,845,312, 4,896,784 and 5,051,541.

There are a number of different adapters in use to couple electrical conduit, and in particular flexible corrugated electrical non-metallic tubing (ENT), to a conventional junction box. An example of such an adapter can be found in U.S. Pat. No. 4,836,580 where there is provided a conduit connector for joining corrugated conduit to a junction box. While the connector disclosed provides an improvement over the prior art, it requires a very complex mold and must be screwed onto the sidewall of a junction box which itself must be adaptive to the connector. In the context of modern residential and commercial developments where thousands of junction boxes may be required, each on average requiring four connectors, using the conduit connector in '580 presents a labor intensive exercise. Another example of a connector for flexible electrical conduit can be found in U.S. Pat. No. 4,880,387, for which the same problems arise.

In Canadian Patent Application No. 2,085,394 there is provided an improved junction box having knockouts located within tubular projections. When a knockout is removed, a locking ring is formed within the respective tubular projection capable of receiving and retaining flexible corrugated ENT. Although the junction box in '394 provides an improvement over the prior junction boxes, there continues to exist a need in the art for a junction box which is capable of retaining flexible corrugated ENT to the box even under large forces. In particular, many jurisdictions require that junction boxes conform to strict building standards which often require that a junction box meet or exceed pull tests of 150 lbs or more.

Another problem presented by existing junction boxes is the difficulty which arises in feeding electrical wiring between two junction boxes joined by electrical conduit. Conventional designs provide for the electrical conduit to be coupled to a junction box at a tubular extension with an adapter which orients the conduit orthogonally with an outer wall of the box. In such an arrangement it is difficult for an installer to feed wiring between two boxes and the wiring is regularly bent out of shape.

Accordingly, it is an object of the invention to provide an improved junction box which fulfills the above needs. It is a further object of the invention to provide a junction box lid which reinforces the ability of a junction box to retain flexible corrugated tubing.

SUMMARY OF THE INVENTION

According to the invention there is provided a prefabricated plastic junction box for use in interconnecting electrical conduit. The junction box comprises a housing with an exterior wall. At least two tubular projections extend outwardly from the exterior wall and are each dimensioned internally to slidably receive corrugated electrical conduit. Each tubular projection has a hollow interior and a frangible knockout formed therein, the frangible knockout dimensioned to leave an annular ring large enough to snugly pass corrugated electrical conduit when the knockout is removed. Advantageously, the junction box includes a first removable body having locking tabs extending outwardly therefrom, with each locking tab dimensioned to fit between a pair of corrugations of the corrugated electrical conduit. The locking tabs, when so positioned, retain the electrical conduit to the junction box, even under pull tests of 150 lbs. or more.

The first removable body may comprise a lid dimensioned to mate with an open end of the housing.

In one embodiment, the locking tabs are arranged proximate a periphery of the first removable body and are located on the common surface thereof so as to substantially align with a respective one of the tubular projections. For tubular electrical conduit, the locking tabs may include an inwardly rounded end dimensioned to snugly fit circumferentially against an exterior surface of the corrugated conduit.

Each frangible knockout is formed within each tubular projection such that when a knockout is removed, an annular ring extends into an interior of the respective tubular projection and is operative, in combination with the locking tab, to lock the conduit. The ring may have a wedge-shaped cross-section.

In another alternative, the junction box includes second locking tabs dimensioned to fit between a second pair of corrugations of the corrugated electrical conduit. Each second locking tab flexibly extends within the junction box from an inner surface of the junction box proximate an end of a respective one of the tubular projections so as to retain in place the corrugated electrical conduit inserted therethrough and into the box.

In yet another embodiment, there is provided a junction box comprising a housing with an exterior wall from which extend at least two tubular projections, each tubular projection extending at an oblique angle with the exterior sidewall and including a hollow interior with a frangible knockout formed therein. In the above embodiment the oblique angle between each tubular projection and the exterior sidewall is sufficient to permit a user to readily feed wiring into an interior of the housing through electrical conduit coupled to one of the tubular projections. In one preferred embodiment, the oblique angle is in the range of 45 to 80 degrees.

In another aspect of the invention, there is provided a junction box lid for use with a junction box having tubular projections to receive electrical conduit therethrough. The junction box lid comprises a first body dimensioned to mate with the junction box proximate an open end thereof and a plurality of locking tabs arranged proximate a periphery of the first body so as to substantially align with a respective one of the tubular projections. Each locking tab extends outwardly from the first body and have an inwardly rounded end dimensioned to fit circumferentially around an exterior surface of corrugated electrical conduit between a pair of corrugations thereof so as to retain the electrical conduit to the junction box.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

It will be understood that in the figures which are discussed in the detailed description below, like numbers refer to like parts.

DETAILED DESCRIPTION WITH REFERENCE TO THE DRAWINGS

Figure 1:
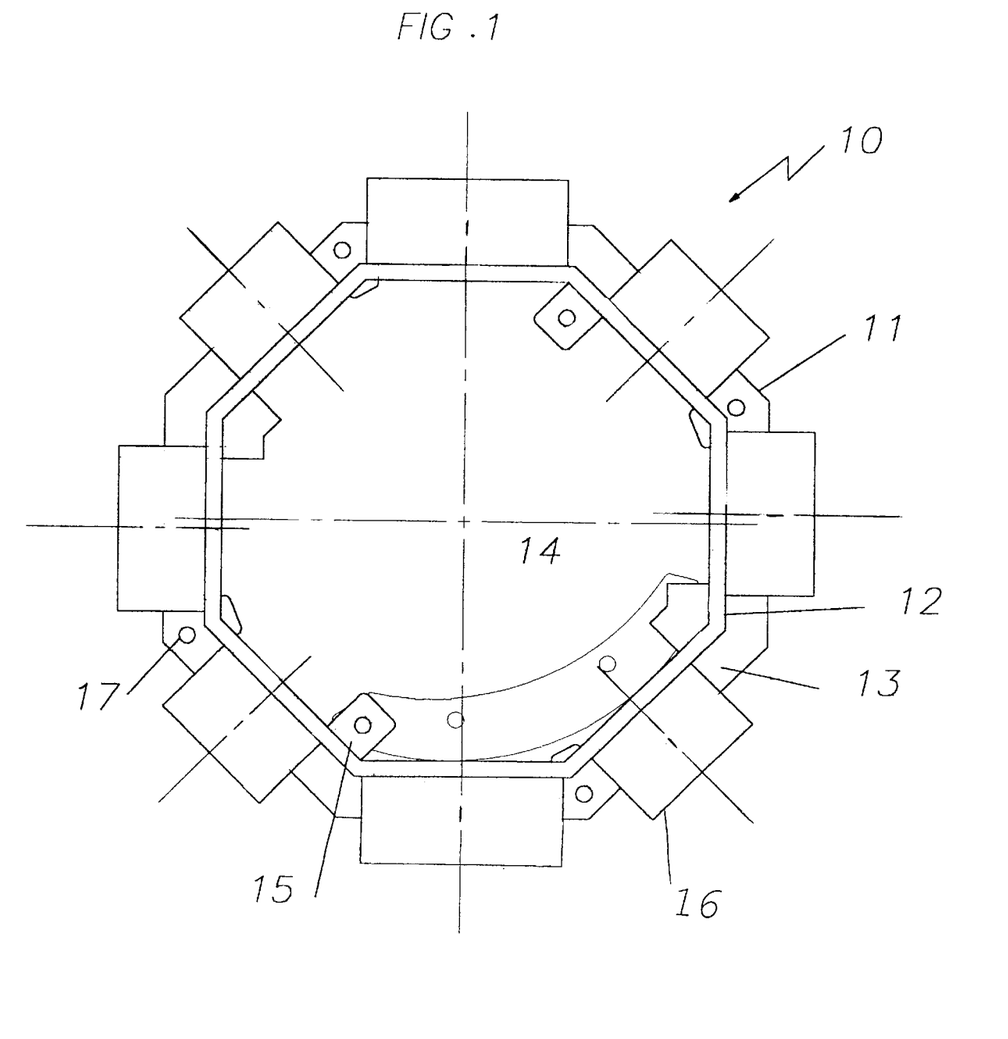
FIG. 1 is a top plan view of a junction box having a plurality of tubular projections.

Referring to FIG. 1, junction box 10 includes molded plastic housing 11 having hollow interior 14 and sidewall 12. A plurality of hollow tubular projections 16 oriented in an orthogonal direction to sidewall 12 extend outwardly from the exterior surface of sidewall 12. In the embodiment shown in FIG. 1, sidewall 12 includes a regularly connected set of rectangular panels 21 forming a continuous polygonal shape.

Figure 2:
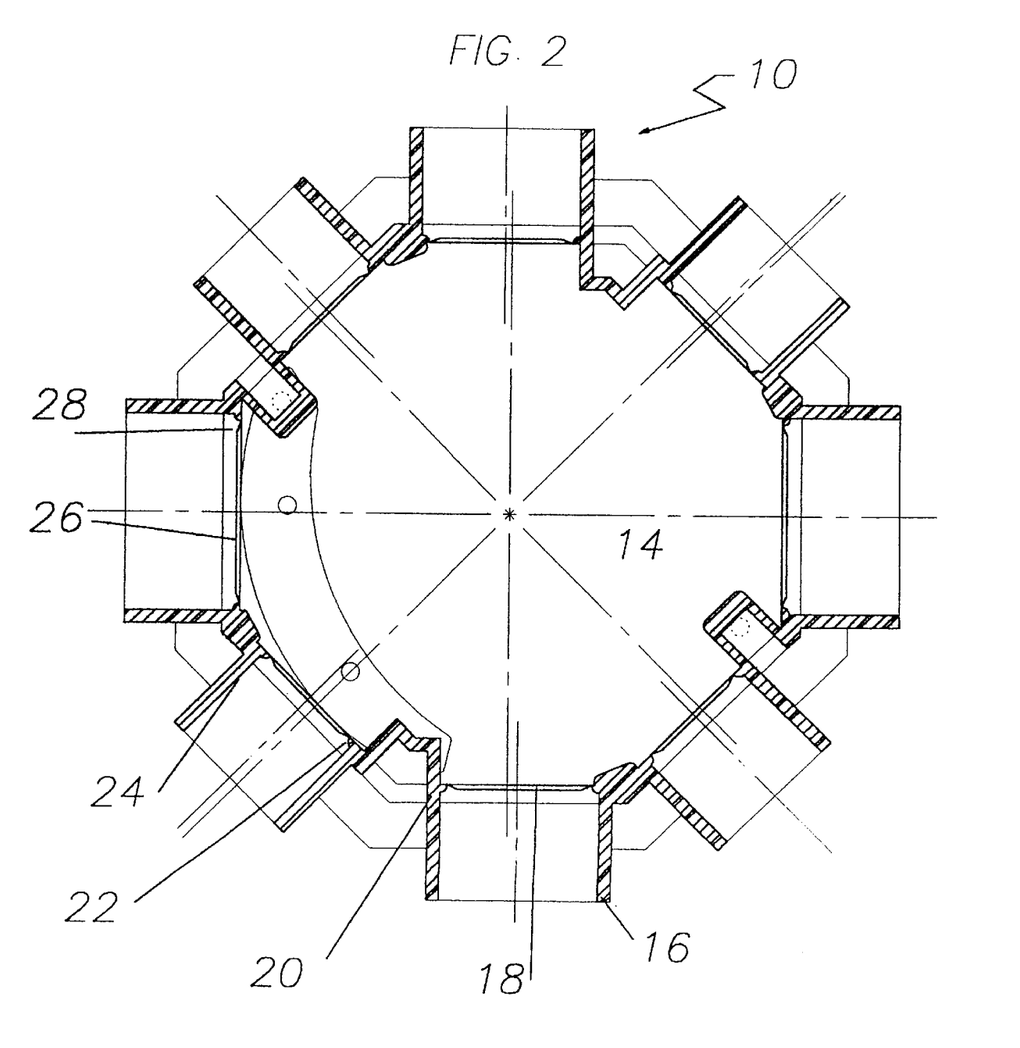
FIG. 2 is a cross-section view of the junction box in FIG. 5 at A—A.

Referring to FIG. 2, flat radial knockouts 18 are located within each of tubular projections 16 proximate region 20 where tubular projections 16 meet with sidewall 12. Radially oriented annular rings 22 extend from inner surface 24 of tubular projections 16 proximate region 20. In the embodiment illustrated, knockouts 18 are oriented substantially flush with an inner surface of sidewall 12 and are each characterized by substantially flat plastic surface 26 having frangible periphery 28 which forms an oblique angle with surface 26.

The junction box shown in FIGS. 1 and 2 includes elongated hollow mounting posts 15 molded to the interior of polygonal sidewall 12 which serve as screw mounts to facilitate the connection of lid 40 (see FIGS. 5 and 6) to sidewall 12 and for mounting electrical fixtures and grounding connections within junction box 10. Junction box 10 is further shown having an outwardly extending polygonal flange 13 to facilitate mounting box 10 to a flat surface. Small holes 17 are located at regular intervals along flange 13 to guide nails or screws used in mounting junction box 10 to a surface.

Figure 2B:
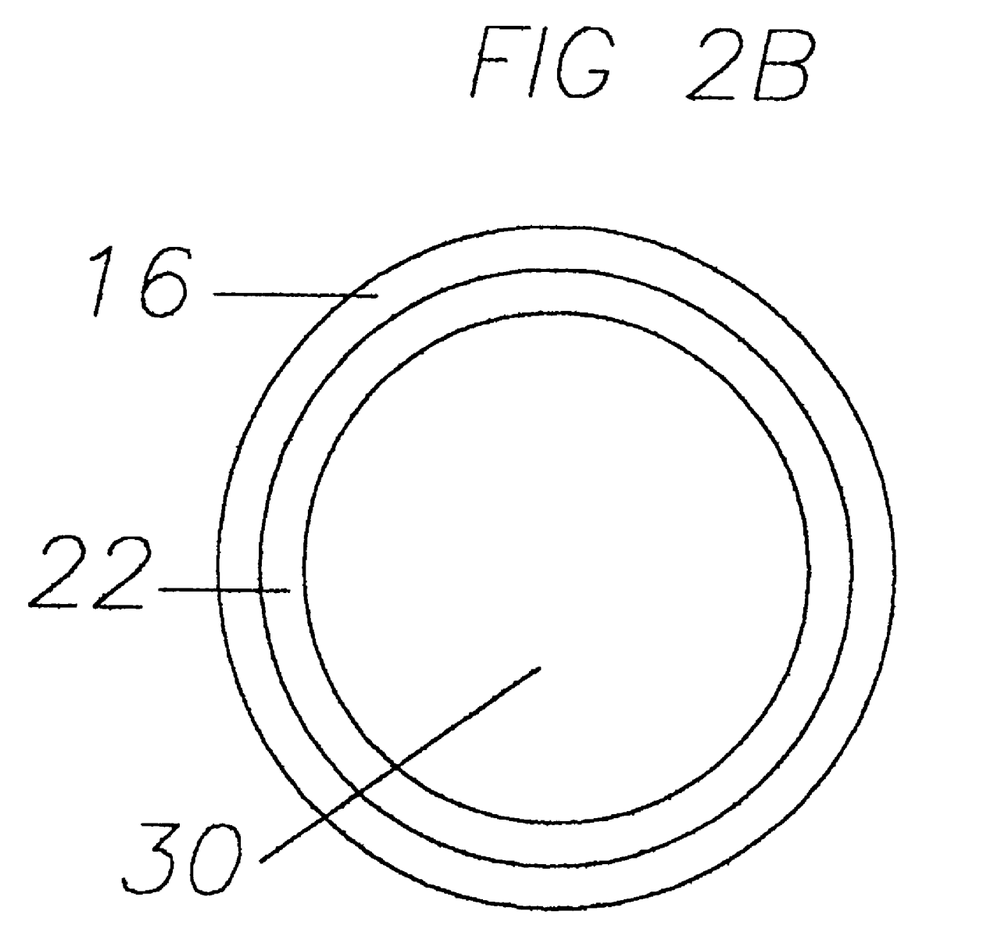
FIG. 2B is a partial side view of a tubular projection having a knockout removed leaving an angular ring.

Referring to FIG. 2B, when selected knockouts are removed from junction box 10, open ports 30 are formed within respective tubular projections 16 and annular rings 22 act as a locking mechanism to retain in position flexible corrugated electrical non-metallic conduit inserted into tubular projections 16 and through angular rings 22. In addition, tubular projections 16 may receive smooth surface PVC conduit, in which case the conduit is glued to the interior surface of the respective tubular extension.

While junction box 10 has the advantage of retaining corrugated electrical conduit without the need for separate adapters, it has been found that the retaining action of annular rings 22 is not capable of securing flexible conduits to the box under pull tests in excess of 100 lbs. In many jurisdictions, this is insufficient to meet building code requirements.

Figure 3:
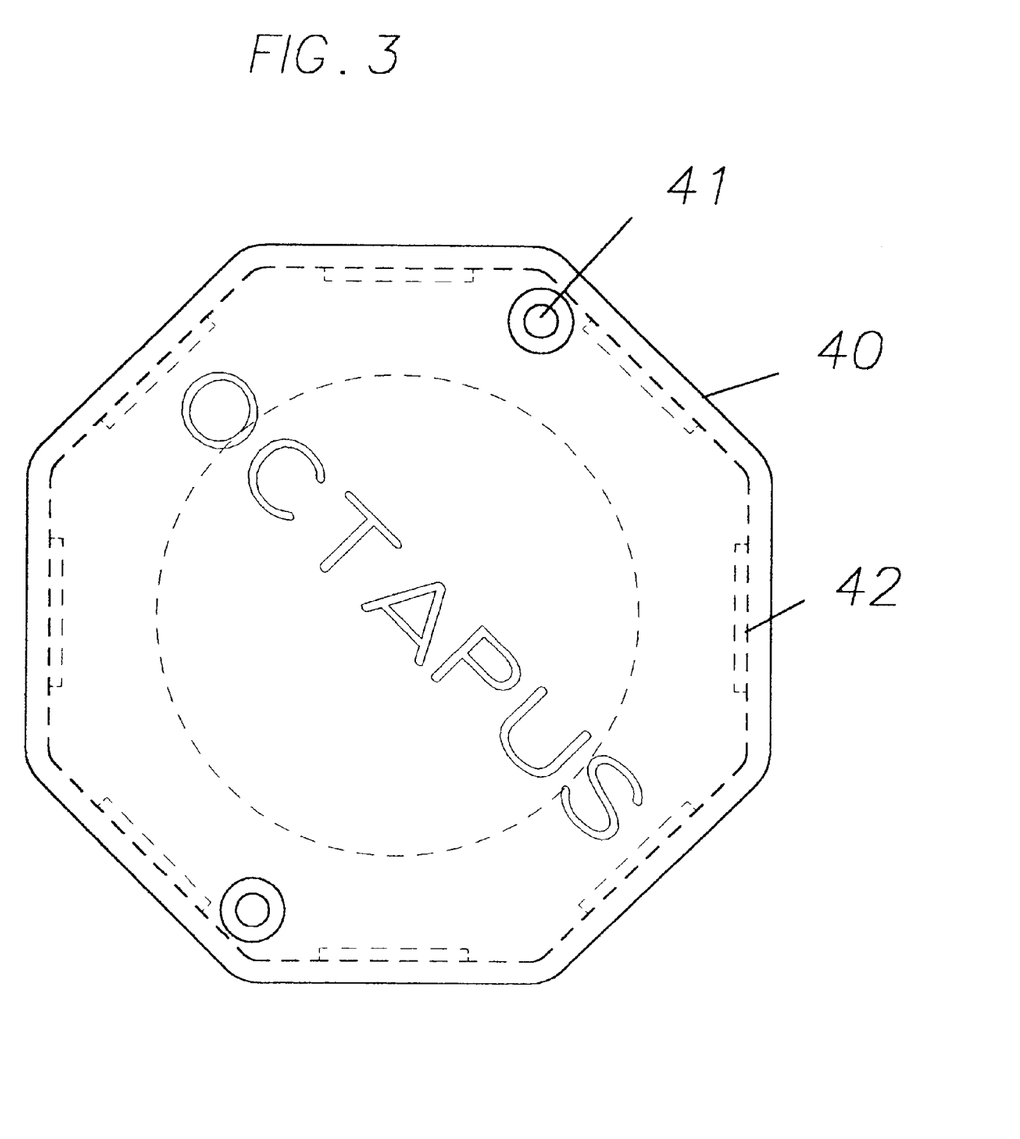
FIG. 3 is a top view of a junction box lid with locking tabs.
Figure 4:
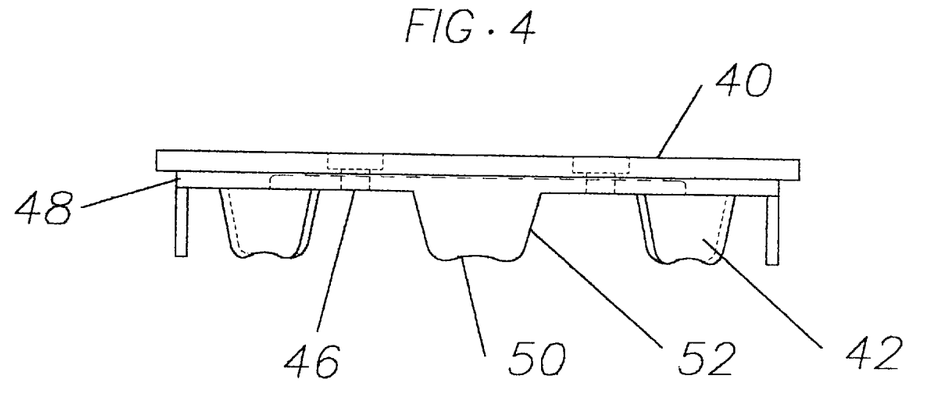
FIG. 4 is a side view of a junction box lid with locking tabs.

Referring to FIGS. 3 and 4, as contemplated within the scope of the present invention there is provided lid 40 dimensioned to fit end 32 of junction box 10. Advantageously, lid 40 includes locking tabs 42 which extend outwardly from a common surface of lid 40. By way of example, locking tabs 42 are shown extending substantially orthogonally from surface 46 proximate periphery 48 of lid 40. Locking tabs 42 are arranged along periphery 48 so as to correspond with a respective tubular projection 16. As a result, in the embodiment shown in FIG. 4, locking tabs 42 are arranged in substantially regular intervals. Lid 40 mates with an open end of junction box 10 and is affixed thereto by inserting screws through screw holes 41 and into mounting posts 15. Lid 40 may also be affixed to box 10 with glue or other contact adhesives.

Figure 5:
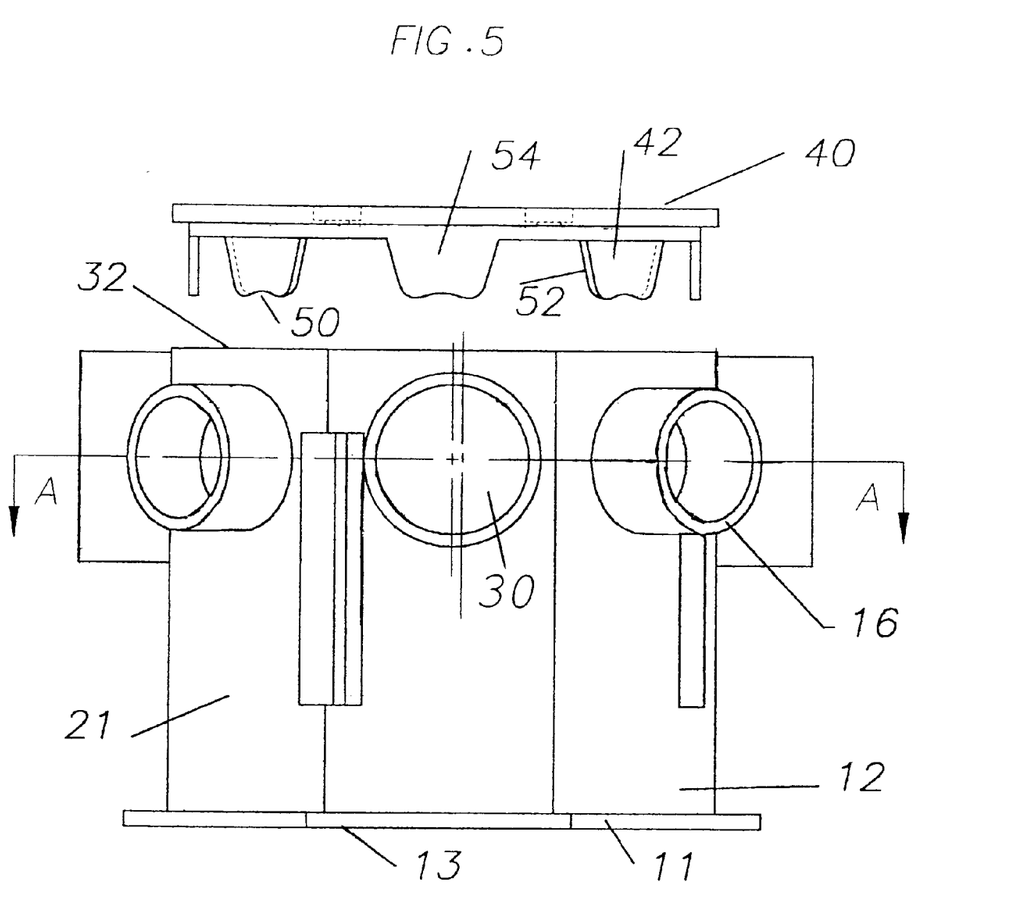
FIG. 5 is a side view of the junction box in FIG. 1 and the junction box lid.
Figure 6:
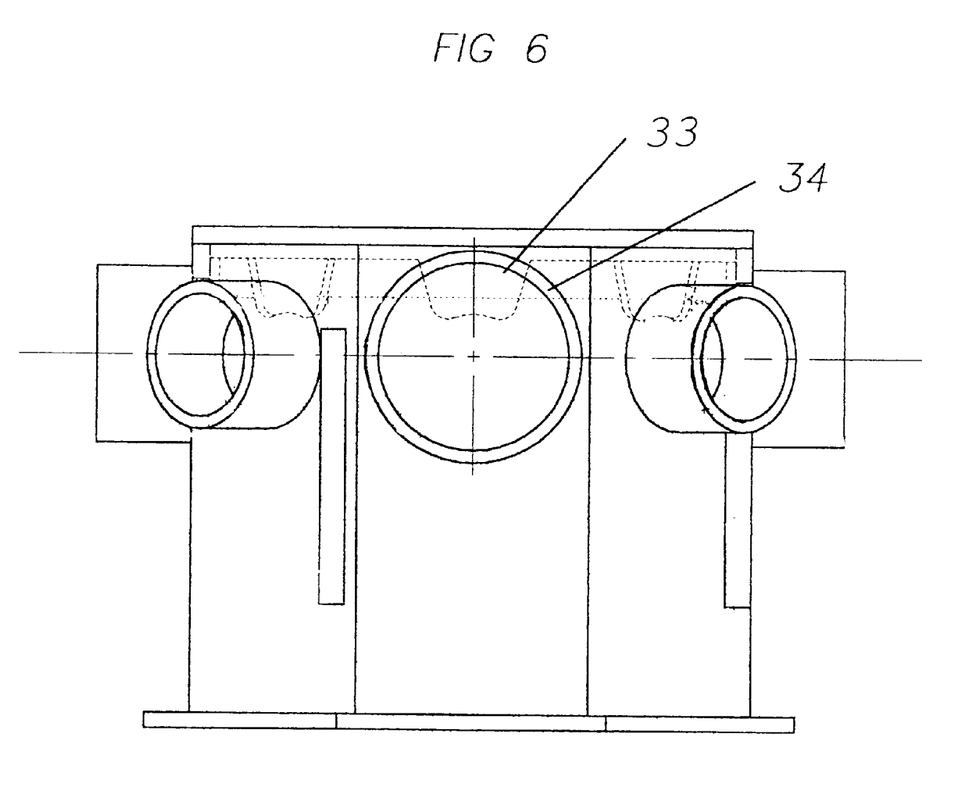
FIG. 6 is a side view of the junction box in FIG. 1 with the junction box lid mounted thereto.

Locking tabs 42 includes inwardly rounded ends 50 and tab sidewalls 52, the ends 50 dimensioned to fit circumferentially between the corrugations of a corrugated electrical conduit. As shown in FIGS. 5 and 6, when lid 40 is coupled to junction box 10 inwardly rounded ends 50 and 54 extend into box 10 beyond an upper region 33 of tubular projections 16. As will also be noted, the size of each rounded end will vary with the size and shape of the respective tubular projection. Accordingly, in the embodiment shown, inwardly rounded end 50 extends from lid 40 further than rounded end 54 as rounded end 54 aligns with a tubular projection having a larger diameter and meant to receive larger electrical conduit.

Figure 7:
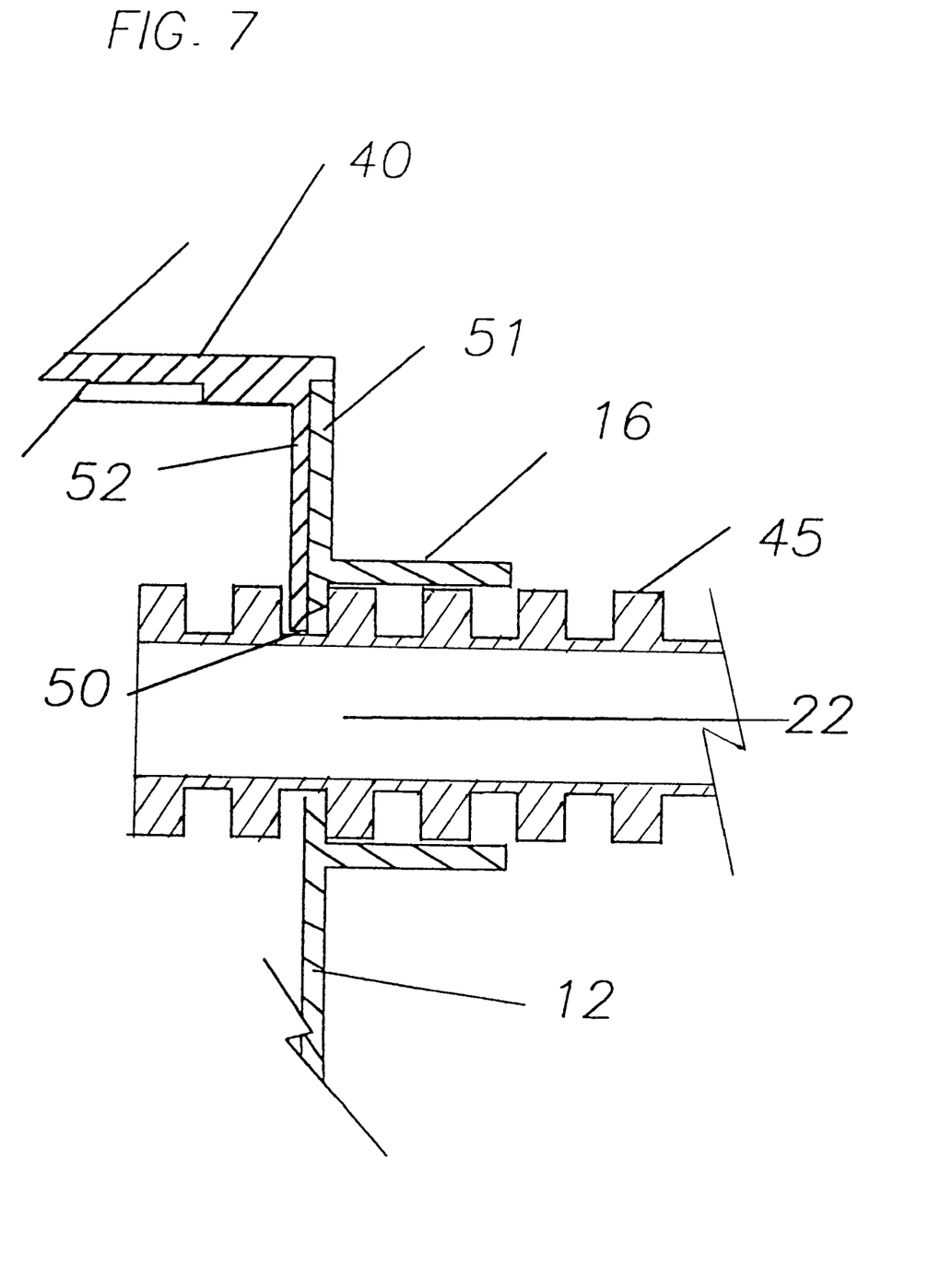
FIG. 7 is a sectional view of a junction box with electrical conduit coupled thereto.

Referring to FIG. 7, when corrugated conduit is inserted through open ports 30 and lid 40 is then mounted onto junction box 10, locking tabs 42 fit snugly between a pair of corrugations. As shown in FIG. 7, tabs 42 preferably are juxtaposed to and abut interior surface 51 of box 10 so as to be supported by surface 51 in resisting pulling on corrugated conduit 45. Advantageously, the additional reinforcing function of locking tabs 42 substantially increases the ability of the junction box to securely retain corrugated electrical conduit in place. Tests have shown that such a junction box having locking tabs 42 in a retaining position against corrugated electrical conduit will pass pull tests of up to 150 lbs. or more.

In FIG. 4, lid 40 has a hexagonal periphery. However, it will be understood that the shape of lid 40 will vary so as to correspond with the selected configuration of junction box 10, wherein the periphery of lid 40 may be polygonal or elliptical. It will also be understood that locking tabs 42 may be configured so as to extend from a lid positionable within the interior 34 of junction box 10 or from a removable surface mountable within junction box 10 without loss of functionality. These embodiments are also contemplated within the scope of the present invention.

It will be noted, referring to FIGS. 1 and 2, that the dimensions of knockouts 18 will vary with the selected tubular projection. It has been found that when a knockout with a thick wall is punched out of a tubular projection, fragments of the knockout may remain attached along portions of the resulting annular ring 22. Such fragments may interfere with the retaining action of locking tabs 42 and may need to be removed. In order to minimize the number of fragments which may result from punching out a knockout, it is preferable to ensure that the knockouts have a relatively small thickness and are readily removable. By way of example only, in a tubular projection having a hollow interior with a 1.1 inch diameter, the respective knockout will typically have a thickness of 0.02 to 0.04 inches and a diameter of 1 inch. When such a knockout is removed, a respective angular ring will have a width of about 0.05 inches.

Figure 8:
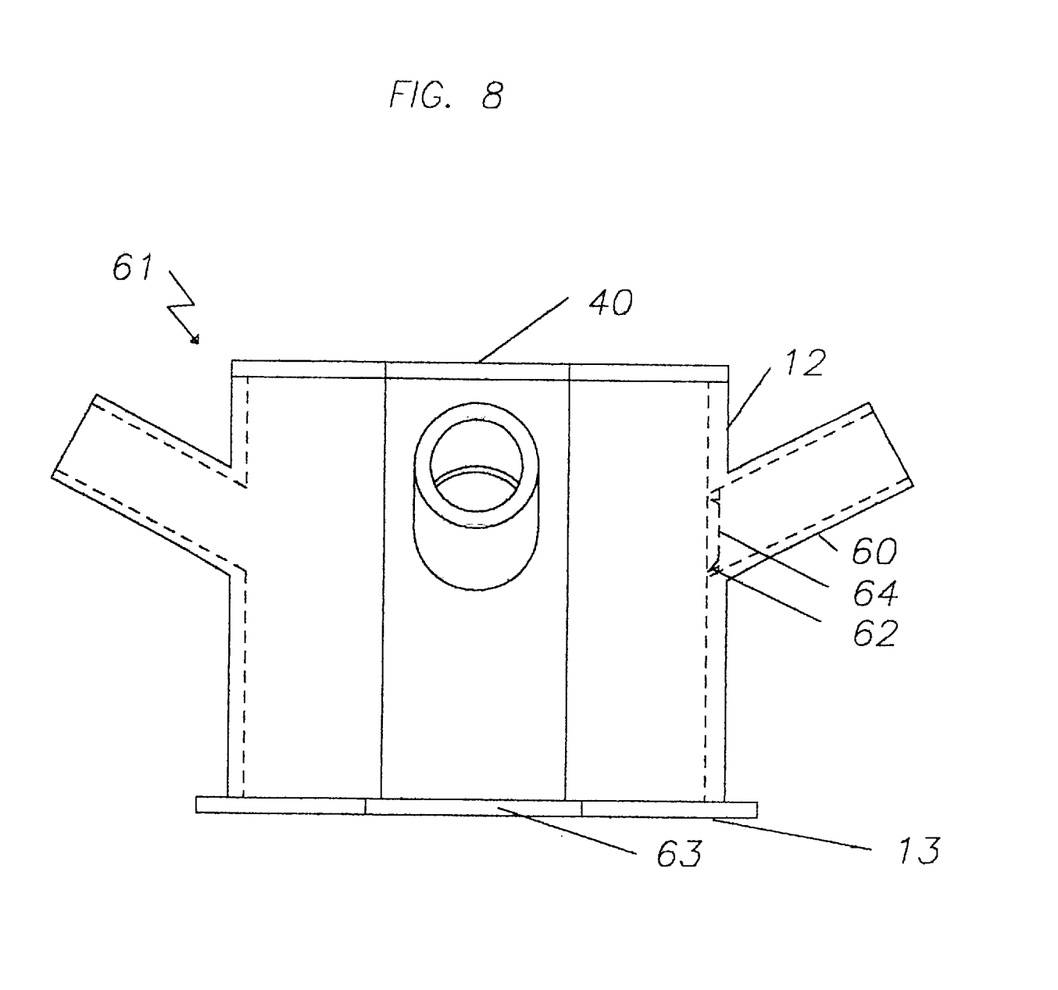
FIG. 8 is a side view of another embodiment of the invention.

Referring to FIG. 8, in another aspect of the invention, there is shown junction box 61 with angled tubular projections 60 which extend outwardly from sidewall 12 at an oblique angle such that tubular projections 60 are inclined towards sidewall 12. Knockouts 64 are molded within each tubular projection 60 proximate an inner surface of box 61 and abut angular rings 62 which, when a knockout 64 is removed, act as an annular locking mechanism. When electrical conduit is mounted within one of tubular projections 60, the configuration shown allows one to more easily pull electrical wiring inserted through the electrical conduit out of end 63 of box 61. As a result, electrical wiring can be fed along an attached electrical conduit from one box to the next with greater ease and with little or no bending of the wiring. This can be particularly useful when using wiring which is susceptible to damage when it is bent. Moreover, when insulated wiring is fed through a junction box it's insulating jacket is susceptible to tearing and bruising due to the substantially right angled orientation of tubular projections in conventional boxes. When such tearing or bruising causes two or more wires to be exposed, there is a danger that a short could arise in the electrical system which can be difficult to locate and correct. Advantageously, the angled tubular projections of junction box 61 allow one to feed insulated wiring through a box while avoiding such tearing and bruising. Typically, tubular projections 60 are inclined towards sidewall 12 at an oblique angle in the range of 45 to 80 degrees, although this angle will vary with the selected application and other angles are contemplated within the scope of the invention.

Figure 9:
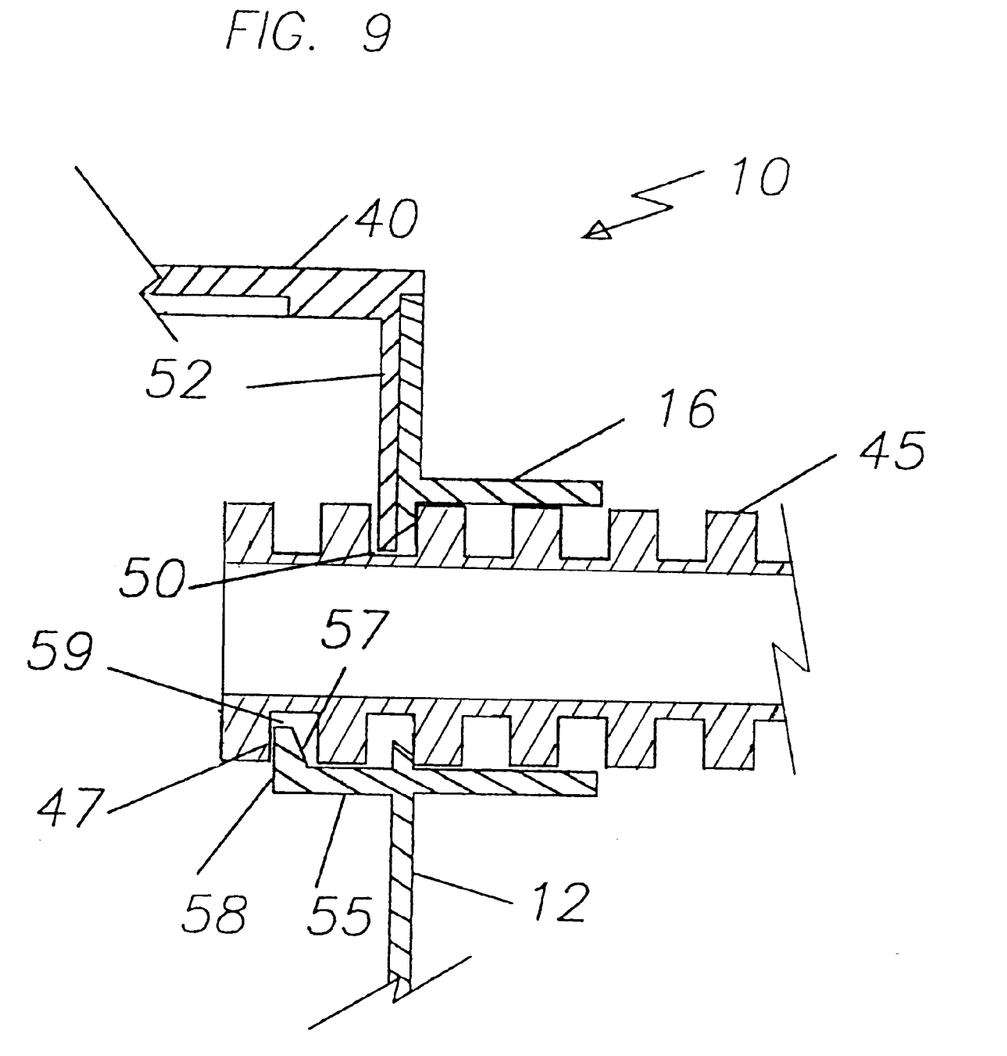
FIG. 9 is a sectional view of another embodiment of the invention.

Referring to FIG. 9, there is shown an alternative embodiment to that shown in FIG. 7. As depicted in FIG. 9, junction box 10 includes lower locking tab 58 with inwardly rounded end 59 which, similar to rounded end 50, fits circumferentially around a portion of sidewall of corrugated electrical conduit 45 between a pair of corrugations. Locking tab 58 is molded within box 10 proximate a lower region of each of tubular projections 16 and preferably includes inclined surface 57. Preferably, includes supporting arm 55 which extends from an inner surface of box 10 near the lower region of locking tab 52. When conduit 45 is inserted through tubular extension 16 and into box 10, tab 58 flexibly bends back to allow corrugations of conduit 45 through, and then returns to its original upward position thereafter to fit between a pair of corrugations. Where pulling forces act to remove conduit 45 from tubular extension 16, locking tab 58 is brought up to abut with corrugation 47 thereby retaining conduit 45 to the box 10. Furthermore, locking tab 58, in combination with locking tab 52, allows one to further improve the retention of conduit 45 to box 10.

Although this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A prefabricated plastic junction box for use in interconnecting corrugated electrical conduit, comprising:
    (a) a housing with an exterior sidewall;
    (b) at least two tubular projections extending outwardly from said exterior sidewall and dimensioned internally to slidably receive corrugated electrical conduit, each tubular projection including a hollow interior and a frangible knockout formed therein, said frangible knockout dimensioned to leave an annular ring having a diameter large enough to snugly pass said corrugated electrical conduit when said frangible knockout is removed; and
    (c) a first removable body with locking tabs extending outwardly therefrom, each locking tab dimensioned to fit between a pair of corrugations of the corrugated electrical conduit when said first removable body is fitted to an opening in said housing so as to press said corrugated electrical conduit against said annular ring and lock the electrical conduit to the junction box preventing movement of said conduit along the axis of said tubular projection.

2. A junction box according to claim 1, wherein said housing has an open end and wherein said first removable body is a lid dimensioned to mate with said open end.

3. A junction box according to claim 1, wherein said locking tabs are arranged proximate a periphery of said first removable body such that each locking tab substantially aligns with a respective one of said tubular projections wherein said locking tabs are juxtaposed to an interior surface of said junction box when in place.

4. A junction box according to claim 1, wherein said corrugated electrical conduit is tubular and wherein said lock tabs each include an inwardly rounded end dimensioned to snugly fit circumferentially around an exterior surface of the corrugated electrical conduit.

5. A junction box according to claim 1, wherein said tubular projections extend a sufficient length outwardly from the sidewall so as to support the conduit against transverse shear forces.

6. A junction box according to claim 5, wherein said annular ring has a wedge-shaped cross-section.

7. A junction box according to claim 1, further comprising second locking tabs dimensioned to fit between a second pair of corrugations of the corrugated electrical conduit, each second locking tab extending within said junction box from an inner surface of said junction box proximate an end of a respective one of said tubular projections so as to retain in place the corrugated electrical conduit inserted therethrough and into said junction box.

8. A prefabricated plastic junction box for use in interconnecting corrugated electrical conduit, comprising:

(a) a housing with an exterior sidewall;

(b) at least two tubular projections extending outwardly from said exterior sidewall at an oblique angle with said exterior sidewall and dimensioned internally to slidably receive corrugated electrical conduit, each tubular projection including a hollow interior and a frangible knockout formed therein, said frangible knockout dimensioned to leave an annular ring having a diameter slightly less than that of each of said tubular projections, allowing said corrugated electrical conduit to snugly pass when said frangible knockout is removed;

(c) a lid dimensioned to fit an open end of said junction box, said lid having a plurality of locking tabs extending outwardly therefrom, said locking tabs aligned with said tubular projections and extending down a distance such that when fitting said lid to the open end of said housing a corresponding one of said locking tabs passes between a pair of corrugations of said corrugated electrical conduit and presses said corrugated electrical conduit into locking engagement with said annular ring;

wherein the oblique angle between each tubular projection and said exterior sidewall is sufficient to permit a user to readily feed wiring into an interior of said housing through electrical conduit coupled to one of said tubular projections.

9. A junction box according to claim 8, wherein said oblique angle is in the range of 45 to 80 degrees.

10. A junction box according to claim 8, further comprising a first removable body with locking tabs extending outwardly therefrom, each locking tab dimensioned to fit between a pair of corrugations of the corrugated electrical conduit so as to retain the electrical conduit inserted through one of said tubular projections to the junction box.

11. A junction box according to claim 10, wherein said housing has an open end and wherein said first removable body is a lid dimensioned to mate with said open end.

12. A junction box according to claim 10, wherein said locking tabs are arranged proximate a periphery of said first removable body such that each locking tab substantially aligns with a respective one of said tubular projections and wherein said locking tabs are juxtaposed to an interior surface of said junction box when in place.

13. A junction box according to claim 10, wherein said corrugated electrical conduit is tubular and wherein said locking tabs each include an inwardly rounded end dimensioned to snugly fit circumferentially around an exterior surface of the corrugated electrical conduit.

14. A junction box according to claim 13, wherein said frangible knockout is formed within each tubular projection by two oblique intersecting surfaces such that when said knockout is removed, an annular ring extends into an interior of a respective one of the tubular projections, and is operative to lock against said conduit.

15. A junction box according to claim 8, further comprising auxiliary locking tabs dimensioned to fit between a second pair of corrugations of the corrugated electrical conduit, each auxiliary locking tab flexibly extending within said junction box from an inner surface of said junction box proximate an end of a respective one of said tubular projections so as to retain in place the corrugated electrical conduit inserted therethrough and into said junction box.

* * * * *